US008250087B2

(12) United States Patent
Eshita

(10) Patent No.: US 8,250,087 B2
(45) Date of Patent: Aug. 21, 2012

(54) INFORMATION PROCESSING APPARATUS, INFORMATION PROCESSING METHOD, AND PROGRAM

(75) Inventor: Shiro Eshita, Tokyo (JP)

(73) Assignee: Sony Corporation (JP)

( * ) Notice: Subject to any disclaimer, the term of this patent is extended or adjusted under 35 U.S.C. 154(b) by 251 days.

(21) Appl. No.: 12/658,073

(22) Filed: Feb. 2, 2010

(65) Prior Publication Data
US 2010/0205145 A1 Aug. 12, 2010

(30) Foreign Application Priority Data

Feb. 9, 2009 (JP) ................ P2009-027565

(51) Int. Cl.
G06F 17/30 (2006.01)
(52) U.S. Cl. ......... 707/763; 707/821; 707/822; 707/828
(58) Field of Classification Search .................. 707/821, 707/822, 828, 763
See application file for complete search history.

(56) References Cited

U.S. PATENT DOCUMENTS

| 5,715,455 | A  | * | 2/1998  | Macon et al. .................... 1/1 |
| 6,141,656 | A  |   | 10/2000 | Ozbutun et al. |
| 6,378,031 | B1 | * | 4/2002  | Kuno et al. ..................... 711/4 |
| 6,477,616 | B1 | * | 11/2002 | Takahashi ..................... 711/111 |
| 6,510,505 | B1 | * | 1/2003  | Burns et al. ................... 711/170 |
| 7,350,049 | B1 | * | 3/2008  | Li et al. ........................ 711/170 |
| 7,613,738 | B2 | * | 11/2009 | Patel et al. ...................... 1/1 |
| 7,634,493 | B2 | * | 12/2009 | Kihara et al. .................... 1/1 |
| 7,752,412 | B2 | * | 7/2010  | Tomlin et al. ................. 711/170 |
| 7,984,231 | B2 | * | 7/2011  | Maeda et al. .................. 711/103 |
| 8,024,383 | B2 | * | 9/2011  | Patel et al. ..................... 707/821 |
| 2001/0016841 | A1 | * | 8/2001 | Karasudani ...................... 707/1 |
| 2003/0188094 | A1 | * | 10/2003 | Ohbi et al. .................... 711/112 |
| 2004/0107204 | A1 |   | 6/2004 | Sakamoto |
| 2004/0210706 | A1 | * | 10/2004 | In et al. ....................... 711/103 |
| 2006/0020745 | A1 | * | 1/2006 | Conley et al. ................. 711/103 |
| 2007/0094442 | A1 | * | 4/2007 | Ito et al. ...................... 711/111 |
| 2008/0046646 | A1 | * | 2/2008 | Tamura et al. ................ 711/113 |
| 2008/0046675 | A1 | * | 2/2008 | Okada et al. .................. 711/173 |
| 2008/0082773 | A1 | * | 4/2008 | Tomlin et al. ................. 711/170 |
| 2008/0082774 | A1 | * | 4/2008 | Tomlin et al. ................. 711/170 |
| 2010/0049776 | A1 | * | 2/2010 | Patel et al. .................... 707/818 |
| 2010/0169274 | A1 | * | 7/2010 | Kulkarni et al. ............. 707/609 |

FOREIGN PATENT DOCUMENTS

EP 0661653 A1 7/1995
(Continued)

OTHER PUBLICATIONS

European Search Report EP 10152366, dated May 31, 2011.

Primary Examiner — Thanh-Ha Dang
(74) Attorney, Agent, or Firm — Lerner, David, Littenberg, Krumholz & Mentlik, LLP

(57) ABSTRACT

An information processing apparatus includes a controller that reads data by outputting, to a storage device having a data-recordable medium, a request for reading data recorded to the medium. Using file system management information corresponding to the data recorded to the medium, the controller generates, and outputs to the storage device, bit map data enabling the storage device to distinguish between the first cluster numbers where the starting data of read files are recorded, and the first cluster numbers where the starting data of non-read files are recorded.

9 Claims, 16 Drawing Sheets

FOREIGN PATENT DOCUMENTS

| | | |
|---|---|---|
| EP | 1229434 A2 | 8/2002 |
| JP | 05-113922 | 5/1993 |
| JP | 06-035780 | 2/1994 |
| JP | 10293714 A | 11/1998 |
| JP | 2005122252 A | 5/2005 |
| JP | 2006209372 A | 8/2006 |
| JP | 2006-277737 A | 10/2006 |
| JP | 2007059004 A | 3/2007 |
| JP | 2008-210226 A | 9/2008 |
| JP | 2008305546 A | 12/2008 |

* cited by examiner

FIG. 1
READ (10) command

| Byte/Bit | 7 | 6 | 5 | 4 | 3 | 2 | 1 | 0 |
|---|---|---|---|---|---|---|---|---|
| 0 | OPERATION CODE (28h) | | | | | | | |
| 1 | RDPROTECT | | | DPO | FUA | Reserved | FUA_NV | Obsolete |
| 2 | (MSB) LOGICAL BLOCK ADDRESS | | | | | | | |
| 5 | | | | | | | | (LSB) |
| 6 | Reserved | | | | | GROUP NUMBER | | |
| 7 | (MSB) TRANSFER LENGTH | | | | | | | |
| 8 | | | | | | | | (LSB) |
| 9 | CONTROL | | | | | | | |

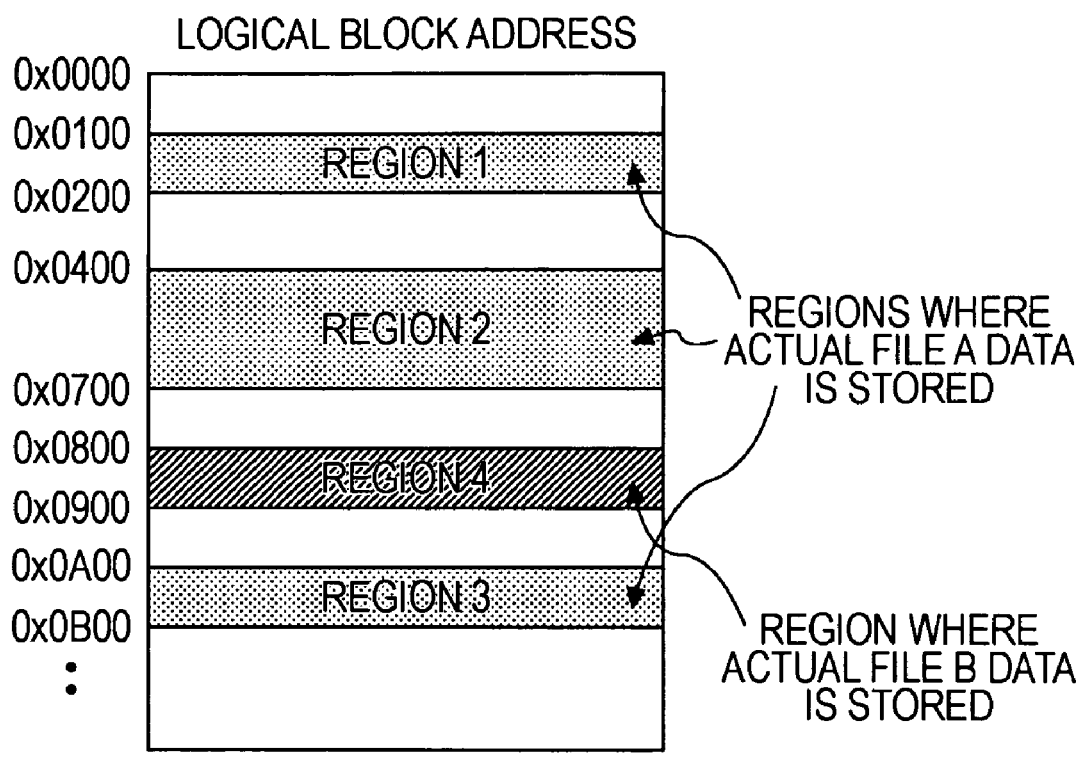

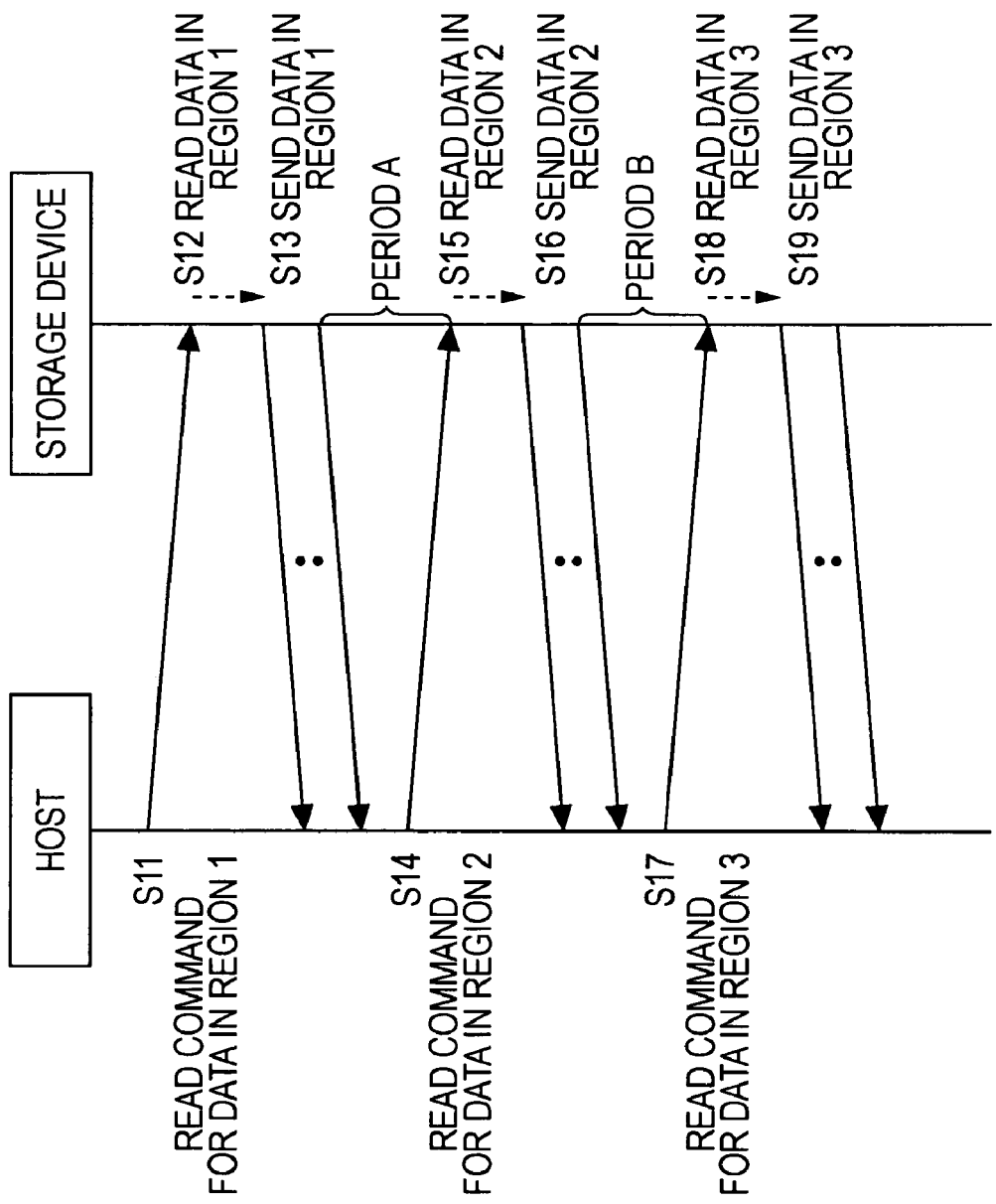

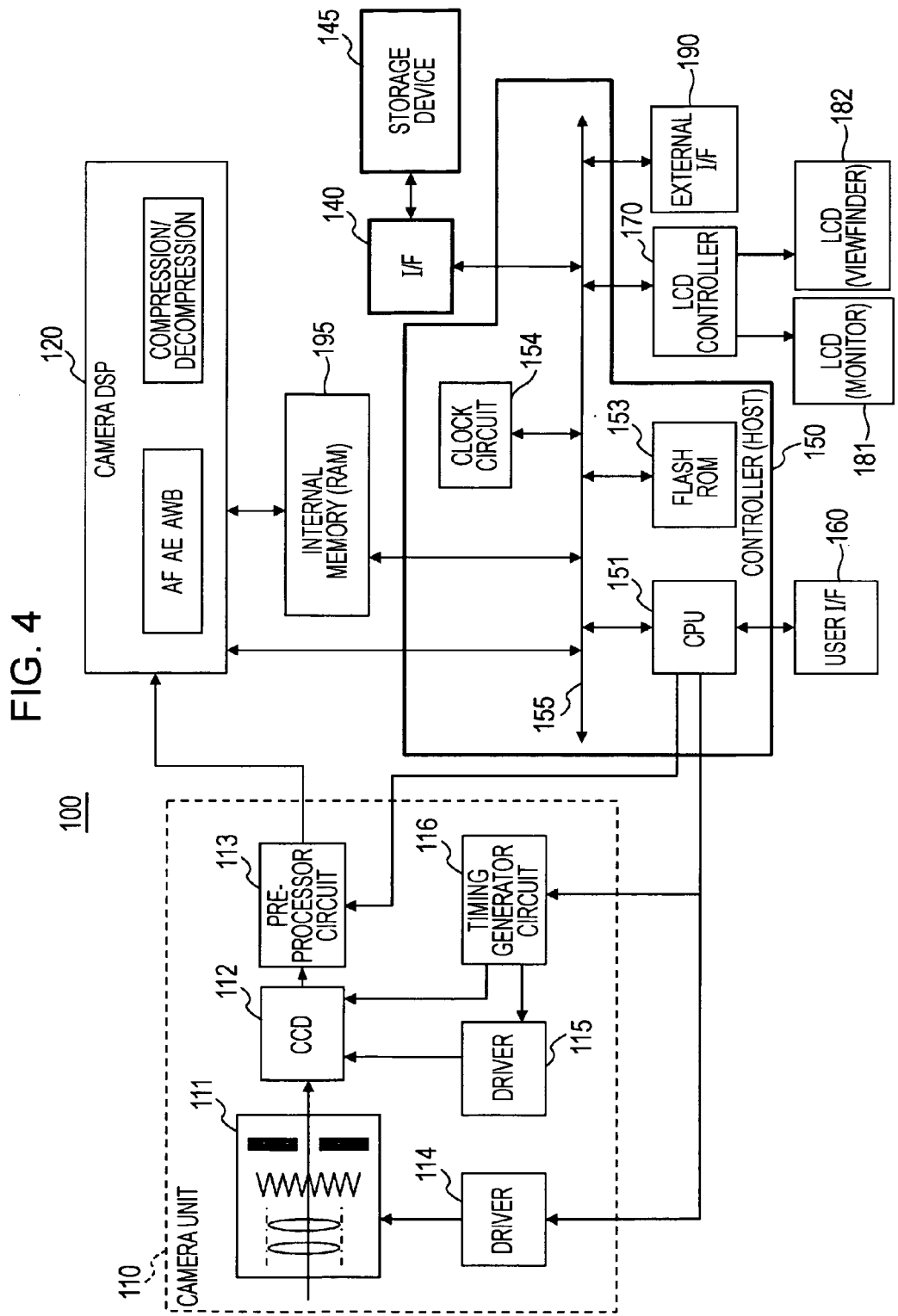

FAT32

FAT16

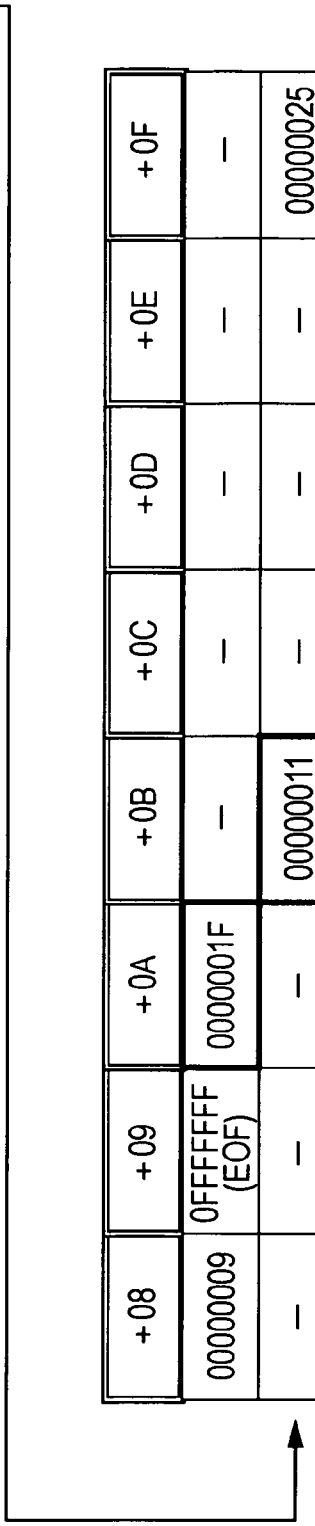

FIG. 9

| CLUSTER NO. | |
|---|---|
| 2 | FILE A |
| 3 | FILE A |
| 4 | FILE D |
| 5 | *FILE B* |
| 6 | FILE A |
| 7 | FILE H |
| 8 | FILE D |
| 9 | *FILE C* |
| 10 | FILE B |
| 11 | *FILE D* |
| 12 | *FILE G* |
| 13 | FILE G |
| 14 | *FILE F* |
| 15 | FILE F |
| 16 | FILE F |
| 17 | FILE F |

| CLUSTER NO. | |
|---|---|
| 18 | FILE C |
| 19 | *FILE A* |
| 20 | FILE G |
| 21 | FILE G |
| 22 | FILE C |
| 23 | FILE H |
| 24 | FILE K |
| 25 | FILE K |
| 26 | FILE K |
| 27 | FILE K |
| 28 | *FILE E* |
| 29 | *FILE J* |
| 30 | *FILE J* |
| 31 | FILE M |
| 32 | FILE M |
| 33 | *FILE K* |

| CLUSTER NO. | |
|---|---|
| 34 | FILE N |
| 35 | FILE N |
| 36 | FILE N |
| 37 | FILE N |
| 38 | FILE N |
| 39 | FILE H |
| 40 | *FILE L* |
| 41 | FILE L |
| 42 | *FILE M* |
| 43 | FILE M |
| 44 | *FILE O* |
| 45 | FILE O |
| 46 | FILE O |
| 47 | FILE J |
| 48 | *FILE J* |
| 49 | FILE O |

| CLUSTER NO. | |
|---|---|
| 50 | FILE N |
| 51 | FILE N |
| 52 | FILE P |
| 53 | FILE N |
| 54 | FILE N |
| 55 | FILE H |
| 56 | FILE P |
| 57 | FILE P |
| 58 | FILE P |
| 59 | FILE P |
| 60 | FILE P |
| 61 | FILE Q |
| 62 | *FILE P* |
| 63 | *FILE Q* |
| 64 | *FILE Q* |
| 65 | FILE E |

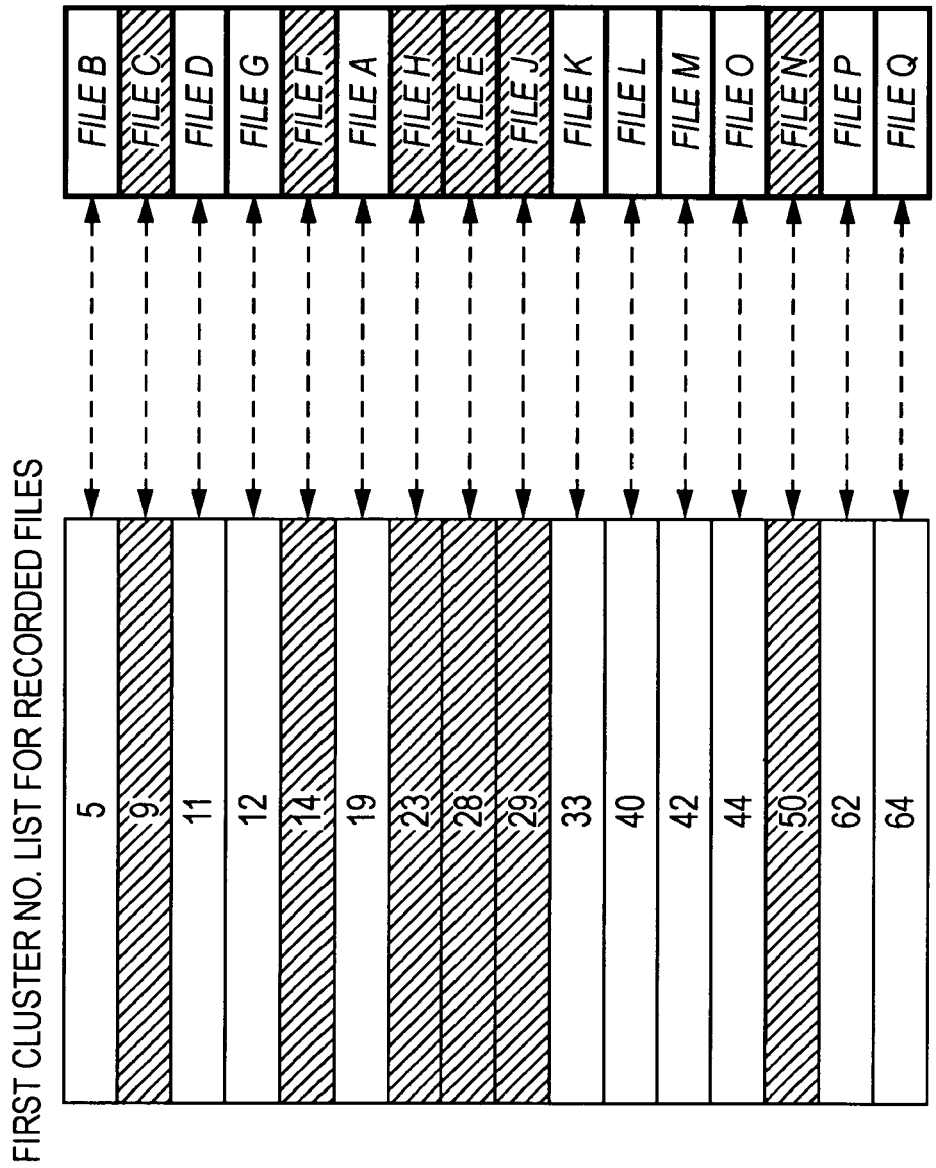

FIG. 11

FIRST CLUSTER NO. LIST FOR READ FILES

| FILE NAME | FIRST CLUSTER NO. |
|:---:|:---:|
| FILE C | 9 |
| FILE F | 14 |
| FILE H | 23 |
| FILE E | 28 |
| FILE J | 29 |
| FILE N | 50 |

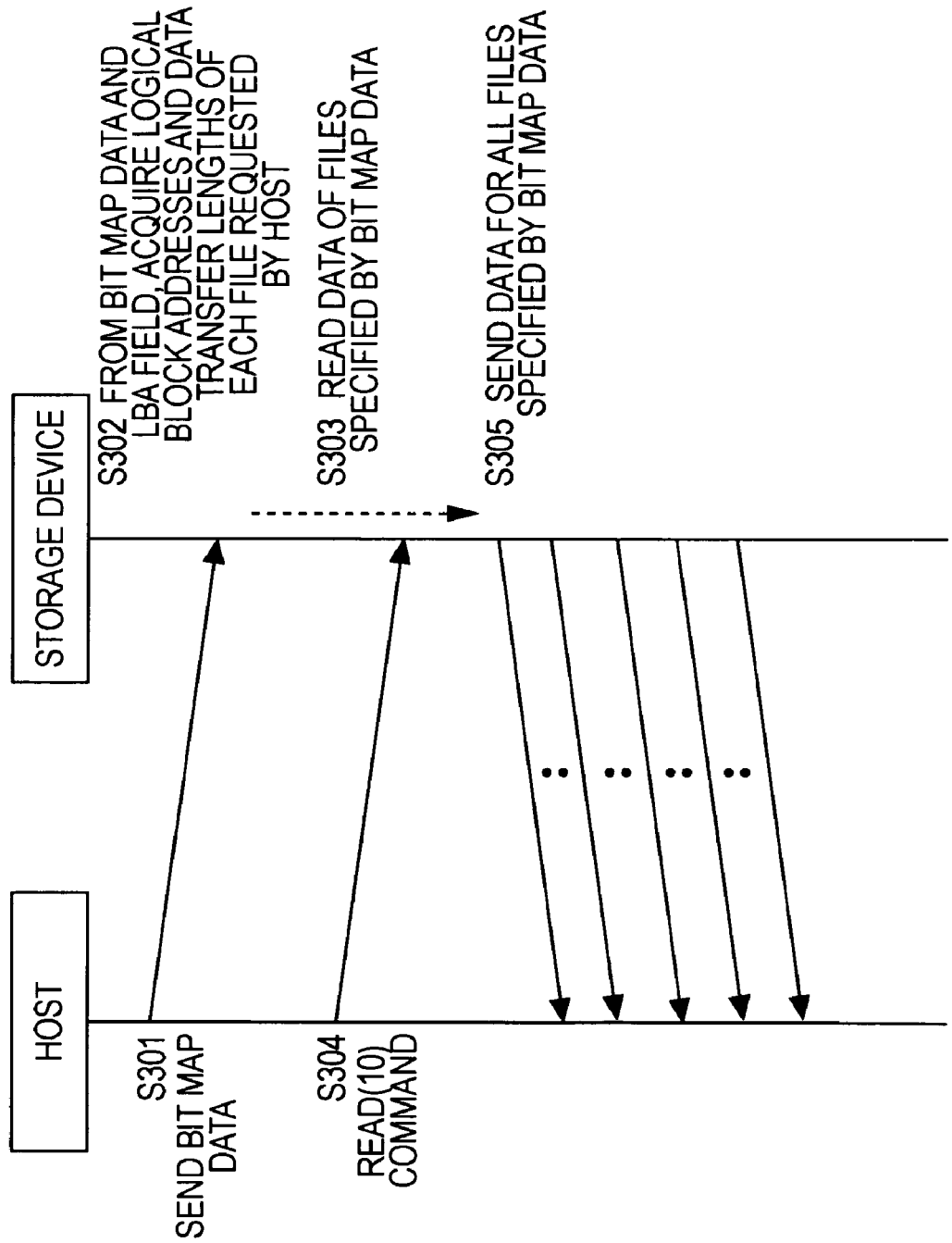

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP JP 2009-027565 filed in the Japanese Patent Office on Feb. 9, 2009, the entire content of which is incorporated herein by reference.

BACKGROUND OF THE INVENTION

1. Field of the Invention

The present invention relates to an information processing apparatus, an information processing method, and a program therefor. More specifically, the present invention relates to an information processing apparatus, an information processing method, and a program whereby processing is executed to read data recorded in a storage device, for example.

2. Description of the Related Art

Recently, storage devices are being used as the data storage apparatus for equipment such as personal computers (PCs), cameras, and PDAs. A storage device is connected to a PC, camera, PDA, or similar host via an interface (I/F) such as USB (Universal Serial Bus) or SATA (Serial ATA), and data is transferred with the host.

When, for example, the host reads data from the storage device, a Read command is used as stipulated by a standard between the host and the storage device, such as ATAPI (ATA Attachment Packet Interface) or SCSI (Small Computer System Interface).

Hereinafter, an exemplary case of using the READ(10) command of the SCSI standard will be described as one example of a typical data transfer process between a host and a storage device in the related art. FIG. 1 illustrates the format of the READ(10) command in the SBC-2 (SCSI Block Commands-2) of the SCSI standard. The READ(10) command has a 10-byte structure made up of bytes 0 to 9, as shown in FIG. 1.

The 0th byte is the operation code field, the 2nd through 5th bytes are the logical block address field (hereinafter also referred to as the LBA field), and the 7th through 8th bytes are the transfer length field. Fields unrelated to the present invention are herein omitted from description.

The operation code field expresses an identifier for the command. In the present example, the operation code is 28h, which indicates that the present command is READ(10). The LBA field stores the logical block address (LBA) of the beginning of the data requested by the host. The storage device reads the data at the logical block address (LBA) specified by the command and sequential addresses thereafter, and successively transfers the data to the host. The transfer length field stores the total transfer length of the data requested by the host. The units of transfer length in READ(10) are logical blocks. For example, if one block is 512 bytes, then a single unit becomes 512 bytes, and the transfer length multiplied by 512 bytes yields the data transfer length in units of bytes.

When the host requests the storage device to read data using the READ(10) command, the host first stores respective parameters for the operation code, the logical block address (LBA), and the transfer length within the READ(10) command, and then transfers the command to the storage device. Upon receiving the command sent from the host, the storage device determines that the present command is the READ(10) command by referencing the operation code field of the command. Next, the storage device sequentially reads data in address order starting from the logical block address indicated by the LBA field, and sends the data to the host. The storage device sends data having the length indicated by the transfer length field, and then terminates data transfer. The above thus summarizes the data transfer method for the READ(10) command.

Meanwhile, the data requested by the host might be scattered among the logical block addresses (LBAs) of the storage device. A data storage example in the case of a representative file system, FAT (File Allocation Table), will now be described by way of example with reference to FIG. 2. FIG. 2 illustrates the relationship between stored data and the logical block addresses that have been set in accordance with the memory managed by the storage device.

As shown in FIG. 2, in the FAT file system, a single file might be scattered among a plurality of logical block addresses, and the data might not be arranged in sequential logical block addresses. In the example shown in FIG. 2, the actual data constituting a file A is scattered among regions 1, 2, and 3. This state called file fragmentation. The actual data for a file B is stored in a region 4.

In addition, when the host requests the storage device to read multiple files, the requested data might be scattered among different logical block addresses, and the data might not be arranged in sequential logical block addresses. In such cases, the host acquires the desired data by sending individual read commands to the storage device for each logical block address corresponding to the scattered data.

Storing data in a scattered manner on a storage device leads to a decrease in the speed of data transfer between the host and the storage device. The cause of the above will now be described with reference to FIG. 3. FIG. 3 illustrates a sequence in the case of the host reading data from the storage device.

The sequence diagram shown in FIG. 3 illustrates a processing sequence for the case of reading a file A, which was divided and recorded to the regions 1 to 3 shown in FIG. 2. First, in step S11, the host sends a read command to the storage device, requesting to read the region 1 shown in FIG. 2. Upon receiving the command, in step S12 the storage device acquires the logical block address requested by the host from the LBA (logical block address) field, and initiates reading of the data specified by the logical block address, or in other words, the data in the region 1. Subsequently, in step S13, the storage device successively transfers the data read from the region 1 to the host.

After completely receiving the requested data in the region 1, in step S14 the host sends a read command to the storage device requesting to read the next region 2. Upon receiving the command, in step S15 the storage device initiates reading of the data in the region 2, and in step S16, successively transfers the data read from the region 2 to the host.

Furthermore, after completely receiving the requested data in the region 2, in step S17 the host sends a read command to the storage device requesting to read the next region 3. Upon receiving the command, in step S18 the storage device initiates reading of the data in the region 3, and in step S19, successively transfers the data read from the region 3 to the host.

In this way, individual read commands set with the logical block addresses corresponding to respective memory regions are generated and sent by the host for each of the plurality of scattered regions constituting part of the entire memory region storing the file to be read. The storage device likewise reads data from the respective regions for each of the plurality of commands from the host, and successively replies to the host with the read data. In this case, the storage device does not execute any processing during the time between the end of the last data transmission for a given read command and the arrival of the next read command. In other words, wasted time is produced. The periods A and B shown in FIG. 3 correspond to such wasted time.

Also, the storage device first learns the logical block address requested by the host upon receiving the next read command from the host, and only then begins to actually read the media. For this reason, data is not returned to the host immediately after receiving a command. This becomes an additional cause of the decrease in the speed of data transfer.

Furthermore, the fact that individual read commands are sent for each of the scattered logical block addresses means that the processing to receive a command and analyze its contents is repeated in the storage device for each sent command. Such processing takes time. In addition, data transfer for announcing the state of the storage device is also conducted in the network transport layer, which governs the exchange of typical commands, such as for USB bulk-only transport, for example. Such processing becomes an additional cause of the decrease in the speed of data transfer.

Technology of the related art that discloses countermeasures for the decreases in data transfer rate given above will now be described. First, Japanese Unexamined Patent Application Publication No. 2006-277737 discloses a configuration that utilizes file management information in a FAT (File Allocation Table) file system. Stated in the file management information is cluster chain information for the logical block addresses (LBAs) where the data constituting a single file is recorded. The disclosed configuration utilizes this information.

In other words, by referencing the LBA cluster chain information in the file management information, the controller of the storage device acquires in advance the logical block addresses corresponding to the plurality of individual scatter locations of a file that has been recorded in a scattered manner. Applying this acquired information, the controller predicts the logical block address of the data to be requested by the host after the logical block address in the read command last received from the host. By means of this process, efficient read operations are conducted.

However, the problem with this method is that there is nothing to guarantee that the address predicted in the storage device is the correct address. In other words, the host might suddenly initiate the reading of a separate file, and in this case, the address predicted in the storage device is not used. When the prediction misses in this way, reading of the media by the storage device is aborted, and media reading is restarted at the correct logical block address. There is thus a problem in that when the above situation occurs, the time until data acquisition by the host is significantly delayed rather than improved.

Additionally, since the method for predicting a logical block address given in Japanese Unexamined Patent Application Publication No. 2006-277737 involves predicting from convergence information regarding scattered logical addresses in the file system management information, there is a flaw in that the method is not effective with respect to read commands for multiple files.

Meanwhile, Japanese Unexamined Patent Application Publication No. 2008-210226 discloses a method utilizing an expanded Read command, wherein a plurality of logical block addresses and transfer lengths are specified within the CDB (Command Descriptor Block) of a single command. In so doing, a pseudo-plurality of Read commands are sent with just one command.

With this method, the storage device is able to batch learn a plurality of logical block addresses corresponding to data requested by the host in advance. However, when the implementation follows representative command standards such as the ATAPI and SCSI given earlier, or any of various transport layer protocols, the number of logical block addresses and transfer lengths specifiable at once is limited. For example, in USB bulk-only transport, the maximum command length is 16 bytes. If such standards are not followed, the implementation becomes an independent standard. Since the device driver layer of the host is independently implemented, the above method is flawed in that versatility is compromised in host application development.

Furthermore, the configuration in Japanese Unexamined Patent Application Publication No. 2008-210226 is also flawed in that the method involves securing a large amount of memory for saving the command data in the storage device when there are large numbers of logical block addresses (LBAs) and data transfer lengths sent with one command. For example, an architecture wherein 10000 logical block addresses and data transfer lengths are sent and a single LBA is 8 bytes involves securing a memory region for receiving and storing 80000 bytes in the storage device. This is not realistic for typical embedded devices. As a result, the expanded Read command described above is split several times before being sent. There is thus a flaw in above method in that the advantage of decreasing the number of issued commands is only weakly effective.

SUMMARY OF THE INVENTION

Given the problems described by way of example above, it is desirable to provide an information processing apparatus, an information processing method, and a program whereby more efficient data transfer is realized between a host and a storage device.

An information processing apparatus in accordance with a first embodiment of the present invention includes a controller configured to read data by outputting, to a storage device having a data-recordable medium, a request for reading data recorded to the medium. Using file system management information corresponding to the data recorded to the medium, the controller generates, and outputs to the storage device, bit map data enabling the storage device to distinguish between the first cluster numbers where the starting data of read files are recorded, and the first cluster numbers where the starting data of non-read files are recorded.

In another embodiment of the present invention, the controller uses the file system management information to generate a first cluster number list for recorded files, being a list of the first cluster numbers where the starting data is recorded for all files recorded to the medium, as well as a first cluster number list for read files, being a list of the first cluster numbers where the starting data is recorded for selected files scheduled to be read. The controller generates the bit map data by cross-checking each entry in the first cluster number list for recorded files with those in the first cluster number list for read files.

In another embodiment of the present invention, the controller generates, and outputs to the storage device, transmission data by setting header information with respect to the bit map data, the header information containing information for determining the validity of the bit map data.

In another embodiment of the present invention, the controller generates the bit map data by applying file system management information in the form of a FAT (File Allocation Table) and directory entries.

In another embodiment of the present invention, the controller executes processing to send a single command for reading data to the storage device, whereby the controller acquires from the storage device the read data for one or a plurality of files identified by the bit map data.

A storage device in accordance with another embodiment of the present invention includes a medium upon which data is recorded, and a controller configured to write or read data with respect to the medium. The controller receives, from a host, bit map data enabling the controller to distinguish between the first cluster numbers where the starting data of read files requested by the host are recorded, and the first cluster numbers where the starting data of non-read files are recorded. The controller reads files by applying the received bit map data and file system management information to analyze the clusters where the read files are recorded.

An information processing system in accordance with another embodiment of the present invention includes: a host configured to use file system management information corresponding to data recorded to a medium to thereby generate, and output to a storage device, bit map data enabling the storage device to distinguish between the first cluster numbers where the starting data of read files are recorded, and the first cluster numbers where the starting data of non-read files are recorded; and a storage device configured to receive the bit map data from the host, and read files by applying the received bit map data and file system management information to analyze the clusters where the read files are recorded.

An information processing method in accordance with another embodiment of the present invention is executed in an information processing apparatus, and includes the steps of: using file system management information corresponding to data recorded to a medium to thereby generate, and output to a storage device, bit map data enabling the storage device to distinguish between the first cluster numbers where the starting data of read files are recorded, and the first cluster numbers where the starting data of non-read files are recorded; outputting a request read data recorded to the medium to the storage device; and sequentially receiving from the storage device all data for the read files identified by the bit map data.

A program in accordance with another embodiment of the present invention causes information processing to be executed in an information processing apparatus, and includes the steps of: using file system management information corresponding to data recorded to a medium to thereby generate, and output to a storage device, bit map data enabling the storage device to distinguish between the first cluster numbers where the starting data of read files are recorded, and the first cluster numbers where the starting data of non-read files are recorded; outputting a request read data recorded to the medium to the storage device; and sequentially receiving from the storage device all data for the read files identified by the bit map data.

It should be appreciated that a program in accordance with an embodiment of the present invention may, for example, be provided to an information processing apparatus or computer system capable of executing various program code, the program being providable by means of a storage medium or communication medium that provides the program in a computer-readable format. In so doing, processing in accordance with the program is realized on the information processing apparatus or computer system.

Further features and advantages of the present invention will become apparent upon reading of the following detailed description of exemplary embodiments in conjunction with the attached drawings. In the present specification, a system refers to the logical assembly of a plurality of apparatus, and is not limited to respective apparatus being housed in a single physical unit.

According to an embodiment of the present invention, a host utilizes file system management information corresponding to data recorded in the medium of a storage device. Utilizing this information, the host creates and outputs to the storage device bit map data enabling the storage device to distinguish between the first cluster numbers where the starting data of read files are recorded, and the first cluster numbers where the starting data of non-read files are recorded. The storage device analyzes the bit map data, determines the requested files and corresponding clusters, reads the data constituting the files from the medium, and provides the read data to the host. Such a configuration enables a plurality of files to be read and transferred without the host repeatedly sending commands.

BRIEF DESCRIPTION OF THE DRAWINGS

FIG. 1 is a diagram explaining the format of the format of the READ(10) command in the SBC-2 (SCSI Block Commands-2) of the SCSI standard;

FIG. 2 is a diagram explaining a data storage example in the case of using the FAT (File Allocation Table) file system;

FIG. 3 is a diagram explaining a data processing sequence between a host and a storage device in a data read process of the related art;

FIG. 4 is a diagram explaining an exemplary configuration of a digital camera, given herein as an example of an information processing apparatus in accordance with an embodiment of the present invention;

FIG. 8 is a diagram explaining an exemplary data structure of a typical file allocation table (FAT);

FIG. 9 is a diagram explaining an example of writing files to the medium of a storage device;

FIG. 10 is a diagram explaining an exemplary data structure of a first cluster number list for recorded files;

FIG. 11 is a diagram explaining an exemplary data structure of a first cluster number list for read files;

FIG. 16 is a sequence diagram explaining a communication processing sequence executed between a host and a storage device.

DESCRIPTION OF THE PREFERRED EMBODIMENTS

Figure 5B:
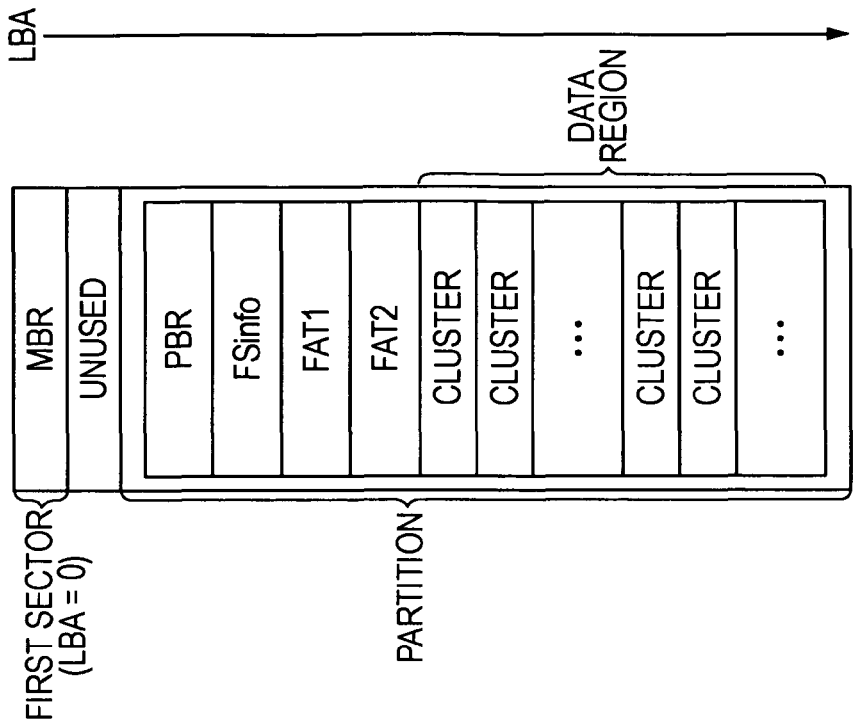
FIG. 5B is a diagram explaining a data structure formatted according to FAT32.

Hereinafter, an information processing apparatus, an information processing method, and a program in accordance with embodiments of the present invention will be described in detail and with reference to the accompanying drawings.

Hereinafter, the following topics regarding embodiments of the present invention will be described in order.

(1) Exemplary configuration of a digital camera given as an example of an information processing apparatus in accordance with an embodiment of the present invention (2) Overview of file system management information (3) Description of information such as the bit map data used for data transfer in an embodiment of the present invention (4) Processing sequences executed by the host and the storage device (1) Exemplary Configuration of a Digital Camera Given as an Example of an Information Processing Apparatus in Accordance with an Embodiment of the Present Invention An information processing apparatus in accordance with an embodiment of the present invention reads and writes data with respect to a storage device, and may be a digital camera, PC, or PDA, for example. First, an exemplary configuration of a digital camera will be described with reference to FIG. 4. The digital camera herein is given as an example of an information processing apparatus in accordance with an embodiment of the present invention.

As shown in FIG. 4, the information processing apparatus (i.e., digital camera) 100 in accordance with an embodiment of the present invention includes a camera unit 110, a camera DSP (Digital Signal Processor) 120, an interface (I/F) 140, and a controller 150. In addition, the information processing apparatus 100 is provided with a user interface 160, an LCD (Liquid Crystal Display) controller 170, LCDs 181 and 182 corresponding to a display and a viewfinder, an external interface (external I/F) 190, and internal memory 195. A storage device (such as a memory card) 145 is also connected via the interface 140, and acts as a storage means for shot images.

As shown in FIG. 4, the camera unit 110 is provided with an optical block 111, a CCD (Charge-Coupled Device) 112, a pre-processor circuit 113, an optical block driver 114, a CCD driver 115, and a timing generator circuit 116. Herein, the optical block 111 includes elements such as focus, shutter, and iris mechanisms.

The controller 150 is a microprocessor made up of a CPU (Central Processing Unit) 151, flash ROM (Read Only Memory) 153, and a clock circuit 154 connected via a system bus 155. The controller 150 controls the various components of the apparatus. The flash ROM 153 stores information such as various programs executed by the CPU 151, as well as data used for processing. The clock circuit 154 is able to provide the current date, weekday, and time, while also providing information such as shooting dates and times.

The internal memory 195 is realized by RAM (Random Access Memory), and is used as a storage area for image data applied to a list display of shot image data.

At the time of shooting an image, the optical block driver 114 operates in response to control from the controller 150 and generates a driving signal that causes the optical block 111 to operate. This signal is supplied to the optical block 111, and causes the optical block 111 to operate. The focus, shutter, and iris mechanisms of the optical block 111 are controlled in response to the driving signal from the driver 114, causing the optical block 111 to acquire a subject image, which is provided to the CCD 112.

The CCD 112 photoelectrically converts and outputs the image from the optical block 111. Operating in response to a driving signal from the CCD driver 115, the CCD 112 acquires the subject image from the optical block 111, and on the basis of a timing signal from the timing generator circuit 116 controlled by the controller 150, the CCD 112 provides the acquired subject image (i.e., image information) to the pre-processor circuit 113 as an electric signal.

The timing generator circuit 116 herein forms timing signals provided at predetermined timings in response to control from the controller 150. In addition, on the basis of a timing signal from the timing generator circuit 116, the CCD driver 115 forms a driving signal supplied to the CCD 112.

The pre-processor circuit 113 subjects the image information in the supplied electric signal to CDS (Correlated Double Sampling) processing to keep a favorable S/N ratio, to AGC (Automatic Gain Control) processing to control the gain, and to A/D (Analog/Digital) conversion to create image data in the form of a digital signal.

The image data expressed as a digital signal in the pre-processor circuit 113 is supplied to the DSP 120. The DSP 120 performs various camera signal processing with respect to the supplied image data, such as AF (Auto Focus), AE (Auto Exposure), and AWB (Auto White Balance). The resulting image data from these various adjustments is then compressed according to a predetermined compression format, supplied to the storage device 145 via the system bus 155 and the I/F 140, and recorded as a file in the storage device 145. The storage device 145 includes a recording medium such as flash memory, an optical medium, or a hard disk, while also including a controller that interprets commands from the (host) controller 150 and controls the recording or reading of data to or from the medium.

The image data recorded in the storage device 145 is read out in response to user input received via the user interface 160. The user interface 160 is made up of elements such as a touch panel or control keys. The read image data is output from the storage device 145 via the I/F 140, and supplied to the DSP 120 via the (host) controller 150.

The DSP 120 decompresses the compressed image data that was read from the storage device 145 and supplied via the I/F 140. The decompressed image data is then supplied to the LCD controller 170 via the system bus 155. From the supplied image data, the LCD controller 170 creates image signals to be supplied to the LCDs 181 and 182. In so doing, images in accordance with the image data recorded in the storage device 145 are displayed on the display screens of the LCDs 181 and 182.

Additionally, the information processing apparatus (i.e., camera) shown in FIG. 4 may be connected to an external personal computer, for example, via the external I/F 190. The information processing apparatus 100 may then receive image data from the personal computer and record such image data to the storage device 145 loaded therein. Alternatively, image data recorded in the storage device 145 loaded into the information processing apparatus may be supplied to the external personal computer.

In addition, by connecting a communication module to the external I/F 190, it is possible for the information processing apparatus to be connected to a network such as the Internet, acquire various image data or other information via the network, and record such information to the storage device 145 loaded therein. Alternatively, data recorded in the storage device loaded into the information processing apparatus may be transmitted to an intended recipient via the network.

It is also possible for image data or other information that has been acquired via an external personal computer or network and recorded to the storage device to be read, played back, and displayed on the LCDs 181 and 182 for viewing by the user.

Herein, it is possible for the external I/F 190 to be provided as a wired interface such as IEEE (Institute of Electrical and Electronics Engineers) 1394 or USB (Universal Serial Bus), or as a wireless interface realized by light or radio waves. In other words, the external I/F 190 may be a wired or a wireless interface.

In the digital camera 100 shown in FIG. 4, AV files may be generated as a result of processing conducted by the (host) controller 150 on the basis of data obtained by shooting (i.e., image acquisition) or audio pickup. The AV files thus generated may then be output and recorded to a medium within the storage device 145. The medium in the storage device 145 may be an HDD, one of various optical disc media, or a semiconductor storage device, for example. The host 150 and the storage device 145 execute data transfer via the interface 140, and data is read or recorded as a result. As described earlier, the storage device 145 includes a controller, although not shown in the drawings. The controller in the storage device 145 interprets commands from the (host) controller 150, and on the basis of such interpreted commands, executes the reading and writing of data.

Files stored in the medium within the storage device 145 are managed according to a format prescribed by the file system used by the information processing apparatus. In the embodiment to be hereinafter described, data recorded to the storage device 145 is taken to be managed using a FAT file system.

(2) Overview of File System Management Information

File system management information will now be described. When reading data recorded to the medium of the storage device, the host of the information processing apparatus in accordance with an embodiment of the present invention uses file system management information corresponding to the data recorded to the medium to generate bit map data. This bit map data is then used to read the data. The bit map data enables the storage device to distinguish between the first cluster numbers where the starting data of read files are recorded, and the first cluster numbers where the starting data of non-read files are recorded. Further details regarding the bit map data will be given later.

Hereinafter, the file system management information applied to the generation of bit map data will be described. The file system management information is management information for the data recorded to the medium. The file system management information is also recorded to a partial area of the medium. The file system management information may include information such as FATs (File Allocation Tables) and directory entries.

For example, in digital cameras, PCs, or other information processing equipment, information may be recorded to a medium such as flash memory, an optical disc, or a hard disk. In such cases, processing is conducted with respect to management information, such as FATs (File Allocation Tables), for the recorded data files.

FAT encompasses several versions such as FAT16 and FAT32. These file systems manage recording location information, cluster chain information, and similar information for each data file recorded to a medium (i.e., an information recording medium). The details of FAT16 and FAT32 are described in the Microsoft Extensible Firmware Initiative FAT32 File System Specification, for example.

Data structures formatted according to FAT16 and FAT32 will now be described with reference to FIGS. 5A and 5B. FIG. 5A illustrates the format according to FAT16, while FIG. 5B illustrates the format according to FAT32.

As shown in FIG. 5A, in the data structure of FAT16, the master boot record (MBR) and partition boot record (PBR) are recorded starting at the first sector (LBA=0), followed in order by the file allocation table 1 (FAT1), the file allocation table 2 (FAT2), and directory entries. After that, a plurality of clusters are set as data regions.

Figure 5A:
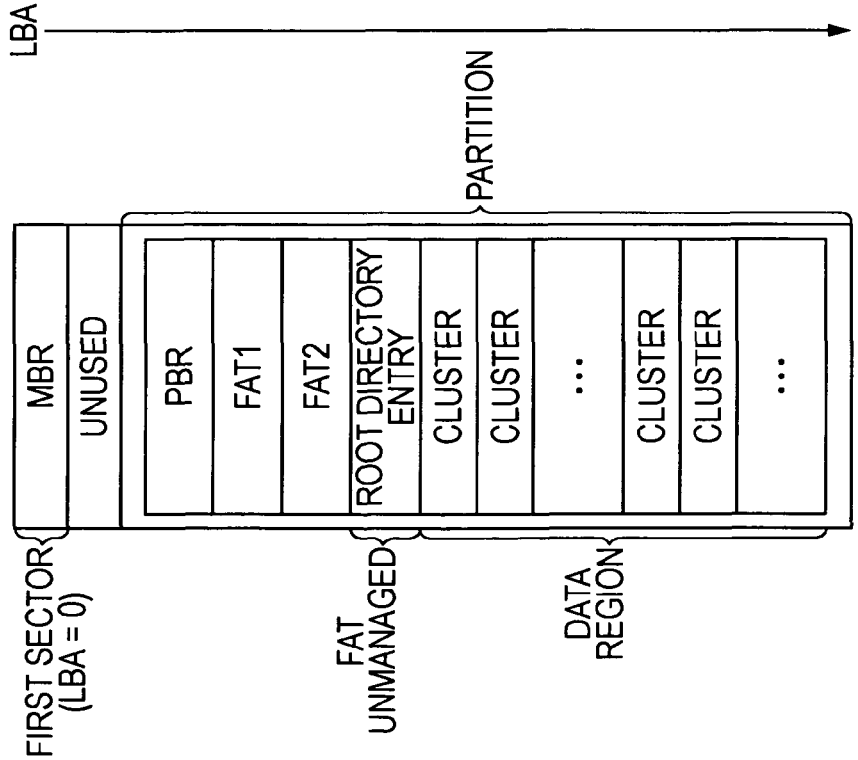
FIG. 5A is a diagram explaining a data structure formatted according to FAT16.

As shown in FIG. 5B, in the data structure of FAT32, the master boot record (MBR), the partition boot record (PBR), and file system information (FSinfo) are recorded starting at the first sector (LBA=0), followed in order by the file allocation table 1 (FAT1) and the file allocation table 2 (FAT2). After that, a plurality of clusters are set as data regions.

Figures 6A, 6B:
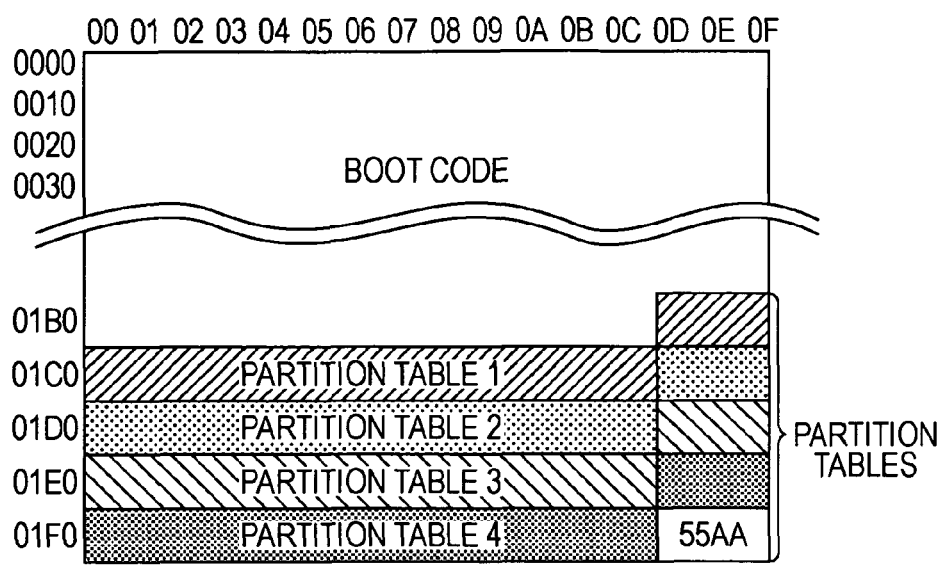
FIG. 6A is a diagram explaining the data structure of a master boot record (MBR)
FIG. 6B is a diagram explaining the data structure of a partition table.

As shown in FIG. 6A, the master boot record (MBR) holds boot information and partition information, or in other words, partition tables containing the start address and size information for each partition. In the FAT16 and FAT32 data structures shown in FIGS. 5A and 5B, only a single partition is shown by way of example, but it is possible to manage the hard disk or other recording medium by subdividing the medium into a plurality of partitions. In this case, partition tables are set containing the start address and size information for each of the plurality of partitions, as shown in FIG. 6A.

At boot, first the boot code (i.e., a program) is read from the boot code region of the MBR. The MBR boot code thus read references the partition tables in the partition table region formed immediately after the boot code shown in FIG. 6A, and reads the boot sector information of the target partition. By means of this boot sector code (i.e., a program), the OS (Operating System) is launched.

The file system is configured such that a plurality of partition tables (such as four) can be set. As described earlier, each partition table holds information indicating the location (i.e., start address) and size (i.e., partition size) of an individual partition region formed by subdividing the recordable region of a hard disk, for example. In the two bytes (0E, 0F) following each partition table, a signature for that partition table is assigned.

FIG. 6B illustrates the data structure of a 16-byte (128-bit) partition table. The 8-byte area from the 0th byte to the 7th byte is an information storage area used when specifying the address in CHS format. The 8-byte area from the 8th to the 15th bytes is an information storage area used when specifying the address in LBA format.

In the CHS format, a group of three parameters (Cylinder, Head, and Sector) is used to specify an address (i.e., location) on a recording medium (i.e., hard disk). In the LBA format, each accessible unit block (such as a single sector) on the recordable region of the hard disk is assigned a block address (i.e., logical address). The block addresses may be an ordered sequence of numbers starting from 0, for example. By specifying such a number, an address (i.e., location) on the recordable region of the hard disk is specified.

As shown in FIG. 6B, the information storage area used when accessing with the CHS format includes the following. The 0th byte is a storage area for active flag information (hereinafter simply referred to as flag information). The 3-byte area from the 1st to the 3rd bytes is a storage area for start sector information used when accessing with the CHS format. The 4th byte is a storage area for partition type information (hereinafter simply referred to as type information). The 3-byte area from the 5th to the 7th bytes is a storage area for end sector information used when accessing with the CHS format.

As also shown in FIG. 6B, the information storage area used when accessing with the LBA format includes the following. The 4-byte area from the 8th to the 11th bytes is a storage area for start sector information used in the LBA format. The 4-byte area from the 12th to the 15th bytes is a storage area for the partition size used in the LBA format.

The CHS format directly uses the physical architecture of the hard disk, and software processing becomes complicated due to having the three parameters of cylinder, head, and sector for specifying an address. In contrast, in the LBA format an address is specified using a single parameter: the block address. For this reason, specifying the address when accessing is extremely simple. Consequently, LBA has become the prevalent addressing scheme for hard disks, and there is an increasingly large number of other recording media able to specify addresses in LBA format, such as the various memory cards that have been broadly adopted as removable media, for example.

Figure 7:
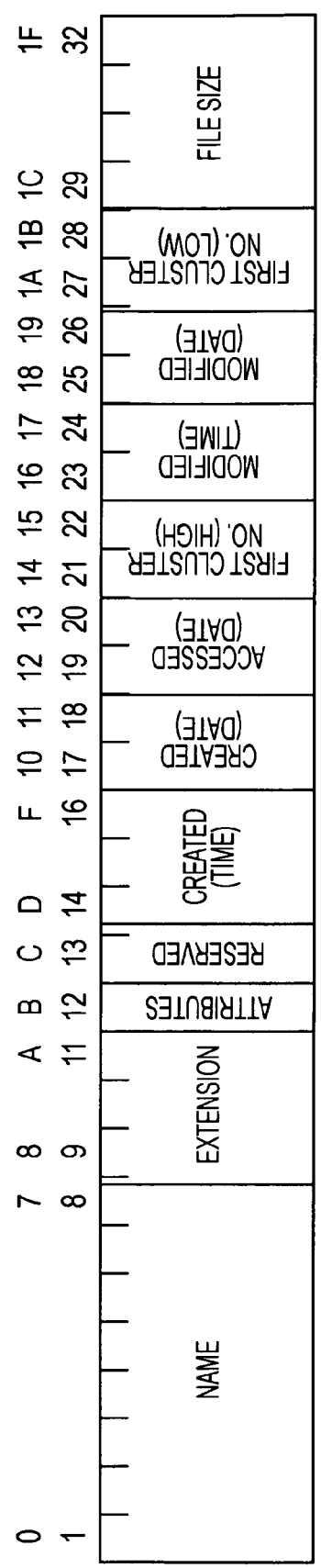
FIG. 7 is a diagram explaining the information structure of a directory entry.

For each file recorded to the information recording medium, file management information such as the file name and recording date is set. FIG. 7 illustrates the information structure of a directory entry containing such file management information created for each file, and stored in a directory provided for each partition. When a file is created within a partition, this directory entry is the file management information created in a directory in accordance with the created file. The directory entry manages detailed information about the created file.

As shown in FIG. 7, a directory entry expressing the file management information corresponding to an individual file is provided with the following fields: a name (i.e., file name) field, an extension field, an attributes field, a reserved field, a created (time) field, a created (date) field, an accessed (date) field, a field for information designating the first cluster number (High), a modified (time) field, a modified (date) field, a field for information designating the first cluster number (Low), and a file size field. Each of the above fields manages the corresponding information, or in other words, the file name, extension, attributes, created time, created date, modified date, first cluster number (High), modified time, modified date, first cluster number (Low), and file size. By using the information in this directory entry, the file specified by the file name can be managed, and information such as the following can be determined: (1) what attributes the file has; (2) where the first cluster is; (3) how large the file is; (4) when the file was created; (5) when the file was last accessed; and (6) when data in the file was modified.

The first cluster number is information specifying, in units of cluster, the memory area of the data region in the partition where the recorded data of the file begins. Stated differently, if the data region of the partition has been subdivided in units of clusters, then the first cluster number indicates which memory area in the sequence of memory areas corresponds to the beginning of the recorded data of the file. Furthermore, in the present example, the first cluster number is managed by being divided into a 2-byte high number and a 2-byte low number, as shown in FIG. 7.

As shown in FIGS. 5A and 5B, a cluster refers to the smallest unit contained in the data region for managing data in FAT. A cluster is a group of a plurality of sectors, and is the smallest unit of recording for a single file. A single cluster is a collection of n sectors (the sector size being 512 bytes in the case of a hard disk), where n is 1, 2, 4, . . . , 64, or 128. Since a sector is the smallest unit of a hard disk, sectors are too small for use as units for managing files, and thus unit regions containing a plurality of sectors (i.e., clusters) are used. In so doing, file management is simplified. The actual size of a cluster is 32 kilobytes in the case of FAT16, and 4 kilobytes in the case of FAT32.

In the FAT data structures shown in FIGS. 5A and 5B, the master boot record (MBR) described with reference to FIG. 6A is followed by a partition boot record containing boot code set with respect to a partition. After that, the file allocation table 1 (FAT1) and the file allocation table 2 (FAT2) are stored.

The file allocation table 2 (FAT2) is used as a backup of the file allocation table 1 (FAT1). In other words, the file allocation table 2 (FAT2) stores a copy of the data in the file allocation table 1 (FAT1).

An exemplary data structure of a typical file allocation table (FAT) will now be described with reference to FIG. 8. The file allocation table (FAT) is a table managing recording location information and cluster chain information for each data file recorded to the medium (i.e., the information recording medium).

As described earlier, the data constituting each data file is recorded to the information recording medium scattered across one or more clusters. The file allocation table (FAT) stores cluster chain information indicating the cluster numbers of the clusters where the data constituting each file is stored.

The FAT shown in FIG. 8 has been split into two segments. The items indicated by double lines are the indices, with the data entries indicating the following cluster numbers:

[0x00000000] to [0x0000000F];
[0x00000010] to [0x0000001F];
[0x00000020] to [0x0000002F]; and
[0x00000030] to [0x0000003F].

Although omitted from the table shown in FIG. 8, the prefix [0x] shown above indicate that the cluster numbers indicated by the subsequent eight digits of values from 0 to F are expressed in hexadecimal.

At the location of each cluster number where part of the file-constituting data is stored, there is recorded the cluster number where the next part of the file-constituting data is stored. At the location of the last cluster number, there is recorded the code [0x0FFFFFFF], which indicates EOF (End Of File). The first cluster number is recorded in the directory entry for each file, as described with reference to FIG. 7.

For example, assume that the following first cluster numbers are recorded in the directory entries for respective files.
1st file: 0x00000007
2nd file: 0x0000000A
3rd file: 0x0000001B
4th file: 0x0000002C Since the first cluster number for the 1st file is [0x00000007], the cluster with the cluster number [0x00000007] is read first, and the beginning data of the 1st file is acquired. The cluster number where the next part of the data constituting the 1st file is recorded can be determined on the basis of the information recorded at the location of the cluster number [0x00000007] in the FAT shown in FIG. 8. At the location of the cluster number [0x00000007] in the FAT shown in FIG. 8, there is recorded the cluster number [0x00000008]. Thus, it is determined that [0x00000008] is the cluster number where the next part of the data constituting the 1st file is recorded, and data is read from the cluster with the cluster number [0x00000008].

Furthermore, the cluster number where the next part of the data constituting the 1st file is recorded is itself recorded at the location of the cluster number [0x00000008] in the FAT shown in FIG. 8. At the location of the cluster number [0x00000008] in the FAT shown in FIG. 8, there is recorded the cluster number [0x00000009]. Thus it is determined that [0x00000009] is the cluster number where the next part of the data constituting the 1st file is recorded, and data is read from the cluster with the cluster number [0x00000009]. Subsequently, when the information recorded at the location of the cluster number [0x00000009] in the FAT is referenced in order to acquire the cluster number where the next part of the file-constituting data is recorded, the code [0x0FFFFFFF]

corresponding to EOF (End Of File) is found to be recorded therein, and thus it is determined that no further data exists.

As a result, it is determined that the 1st file is being stored in the clusters specified by the cluster numbers [0x00000007], [0x00000008], and [0x00000009], in that order.

It is similarly determined that the 2nd, 3rd, and 4th files are being stored in the clusters specified by the following cluster numbers:

for the 2nd file, [0x0000000A], [0x0000001F], [0x00000025], [0x00000031], and [0x00000030], in that order;

for the 3rd file, [0x0000001B], [0x00000011], [0x00000012], [0x00000013], [0x00000014], and [0x00000003], in that order; and for the 4th file, [0x0000002C], [0x0000002D], [0x000000E], [0x0000002F], [0x00000038], [0x00000039], [0x0000003A], and [0x0000003B], in that order.

It is thus possible to acquire the data for the respective files from the above clusters.

Note that the FAT shown in FIG. 8 is a data example corresponding to FAT32. In FAT32, the code corresponding to EOF (End Of File) is [0x0FFFFFFF], whereas in FAT16, the code corresponding to EOF (End Of File) is [0xFFFF]. By detecting the code corresponding to EOF (End Of File), it can be determined that the file-constituting data has ended.

In this way, each file recorded to a medium has three elements:

(a) a directory entry, holding information such as the file name, created date and time, and file size;

(b) an FAT, holding cluster chain information; and (c) data (i.e., the actual file itself), recorded in units of clusters.

These elements are recorded to a medium such as flash memory or a hard disk. On the basis of the directory entry expressing the file system management information, as well as the FAT, the clusters constituting each file are determined, and data is read therefrom. It should be appreciated that the above three elements are recorded to the medium.

(3) Description of Information Such as the Bit Map Data Used for Data Transfer in an Embodiment of the Present Invention Information such as the bit map data used for data transfer in an embodiment of the present invention will now be described.

In the embodiment to be hereinafter described, the command used by the host as a read command is taken to be the READ(10) command of the SCSI standard (hereinafter referred to as the READ command). The format of this command is as described earlier with reference to FIG. 1. The recorded files on the storage device to be read by the host are taken to be fragmented data, and arranged on the medium as shown by way of example in FIG. 9.

FIG. 9 shows the file names of fragmented files existing in respective clusters on a medium. The plurality of files A, B, C, etc. are recorded scattered among the clusters. The cluster numbers where the file names are italicized and framed in bold (such as clusters 5, 9, 11, 12, . . . , and 64) represent the respective first clusters of the files. Due to the specification of the FAT file system, the first cluster number among the clusters constituting the data of a fragmented file is not limited to being the cluster number with the smallest value, and instead any value is possible.

Meanwhile, the clusters shown in gray in FIG. 9 represent the files to be read by the host (i.e., the files C, F, H, E, J, and N). Prior to sending a READ command to the storage device, the host creates bit map data for indicating the files to be subsequently read. The method for the above is hereinafter described.

First, the host uses READ commands to read the entire FAT region on the medium of the storage device. By analyzing each FAT entry, the host acquires the first cluster numbers for all files. As described in the FAT specification, the FAT region forms a table made up of a collection of FAT entries individually corresponding to all clusters on the medium. By storing the next cluster number next in the sequence in each FAT entry, files are managed as sequences of cluster units.

Consequently, by analyzing all cluster chains existing in the FAT region, the host is able to learn the first cluster numbers of all files existing on the storage device. Assume herein that this process yields the extraction of 16 first cluster numbers, as shown by way of example in FIG. 10. These numbers may, for example, be arranged in ascending order for subsequent processing. The list arranged in ascending order as shown in FIG. 10 is herein referred to as the first cluster number list for recorded files.

In the first cluster number list for recorded files shown in FIG. 10, the respective cluster numbers 5, 9, 11, 12, etc. are set. These cluster numbers correspond to the respective first cluster numbers of the files shown italicized and framed in bold in FIG. 9. More specifically, the cluster numbers are the first clusters of the files B to Q shown on the right side of FIG. 10.

In other words, the first entry [5] of the first cluster number list for recorded files shown in FIG. 10 is the first cluster number of the file B. The second entry [9] is the first cluster number of the file C. In this way, the first cluster number list for recorded files shown in FIG. 10 is a list, arranged in ascending order, of the respective first cluster numbers of the individual files recorded to the medium.

However, the first cluster number list for recorded files shown in FIG. 10 is simply a data array expressing the first cluster number of each cluster chain for a plurality of files recorded to the medium, and does not contain information expressing which particular cluster numbers correspond to which files. The files names shown on the right side of FIG. 10 are given merely for the sake of explanation. Since the data acquired by the host from the storage device is just the first cluster number list for recorded files shown on the left side of FIG. 10, the host acquires only the information expressing the first cluster number of each cluster chain for the plurality of files recorded to the medium. Information expressing which particular cluster numbers correspond to which files is not acquired.

Since the host will read the data for a subset of files selected from among the multiple files recorded to the medium of the storage device, the host subsequently acquires the first cluster numbers of the read files (i.e., the files to be read) from the storage device. The first cluster numbers are stored in the directory entries of the respective files, and thus the host is able to acquire the first cluster numbers of the read files by reading the directory entries using READ commands.

This process wherein the host reads files is similar to the data transfer process of the related art. Assume by way of example that the files to be read by the host with this process are the six files (C, F, H, E, J, and N) shown in FIG. 11, and that the first cluster numbers corresponding to the respective files are found to be those listed in FIG. 11. The list shown in FIG. 11 is herein referred to as the first cluster number list for read files.

The host then creates bit map data with respect to the first cluster number list for recorded files shown in FIG. 10 that was acquired earlier. In other words, bit map data is created wherein a single bit is associated with each cluster number set in the respective entries of the ascending list of first cluster numbers for all files recorded to the medium.

The respective bits for each cluster number contained in the entries of the first cluster number list for recorded files are set as follows. The value is [1] for bits corresponding to the first cluster numbers of files to be subsequently read by the host, and the value is [0] for bits corresponding to the first cluster numbers of other files. In other words, a bit is associated with each first cluster number, wherein the value of the bit differentiates between the files to be read by the host and other files. It should be appreciated that the setting of [1] and [0] may also be reversed, and that any bit values may be used if such values enable differentiation between the files to be read by the host and other files.

This process will now be described with reference to the first cluster number list for recorded files shown in FIG. 10, and the first cluster number list for read files shown in FIG. 11. First, the first cluster number 5 in the first cluster number list for recorded files shown in FIG. 10 does not match any first cluster number in the first cluster number list for read files shown in FIG. 11, and thus its bit in the bit map data is taken to be [0].

Figure 12:
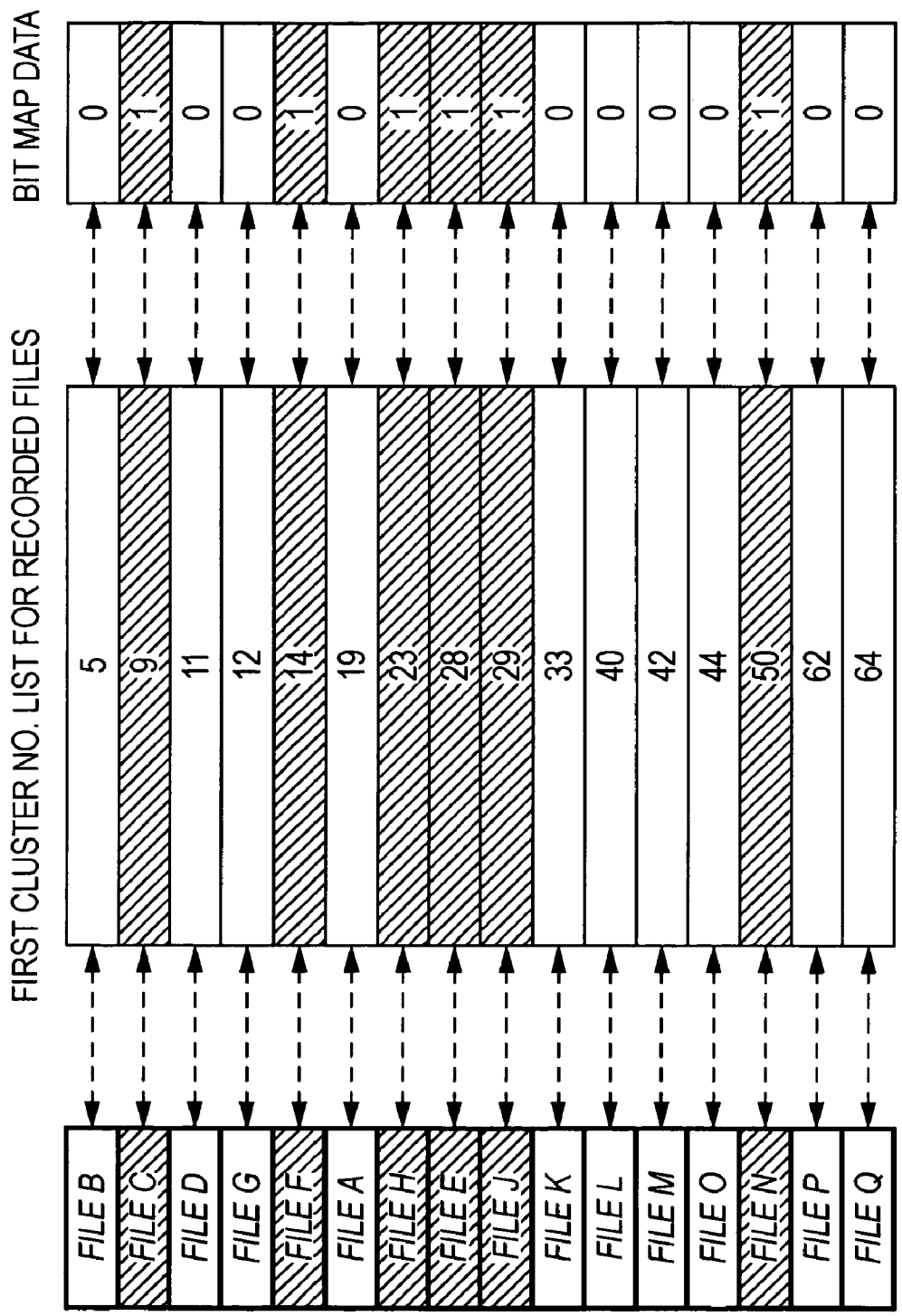
FIG. 12 is a diagram explaining an exemplary data structure of bit map data.

Next, the first cluster number 9 in the first cluster number list for recorded files shown in FIG. 10 matches the first cluster number of the file C in the first cluster number list for read files shown in FIG. 11, and thus its bit in the bit map data is taken to be [1]. In this way, single bits are associated with all first cluster numbers in the first cluster number list for recorded files shown in FIG. 10, and bit map data is created. For example, bit map data like that shown on the right side of FIG. 12 may be created.

Figure 13:
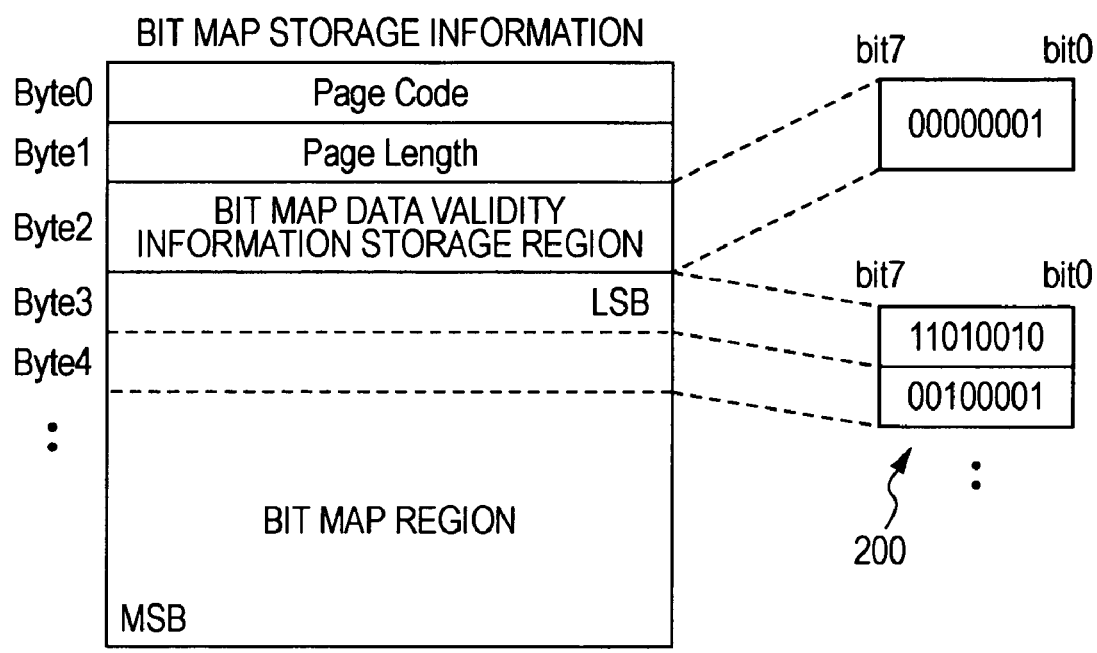
FIG. 13 is a diagram explaining an exemplary data structure of bit map data transmission data, which stores bit map data.

The host also generates bit map data transmission data, wherein header or similar information is set for the created bit map data. For example, the bit map data transmission data (i.e., Page) shown in FIG. 13 may be generated. The region at Byte3 and thereafter in FIG. 13 is a bit map region for storing bit map data 200. This bit map data is identical to the bit map data shown on the right side of FIG. 12. The value expressed from bit0 to bit7 in Byte3 corresponds to the first through eighth bit values from the top of the bit map data shown on the right side of FIG. 12. The value expressed from bit0 to bit7 in Byte4 corresponds to the ninth through sixteenth bit values in the bit map data shown on the right side of FIG. 12.

The region from Byte0 to Byte2 in the bit map data transmission data shown in FIG. 13 is a header information storage region. Byte0 contains code information indicating that the present information (Page) is bit map data transmission data. Byte1 expresses the data length of the information (Page). Byte2 expresses the validity of the files specified by the bit map data stored in the information (Page).

For example, a value of [1] for the last bit in Byte2 indicates that the bit map data stored in Byte3 and thereafter is valid, while a value of [0] in the last bit of Byte2 indicates that the bit map data is invalid.

The host generates the bit map data transmission data shown in FIG. 13, and outputs to the storage device. Subsequently, the host outputs a READ command to the storage device.

Having received bit map data transmission data from the host, the storage device uses the bit map data transmission data received in advance from the host as a basis for selecting the files to be requested for reading by the READ command expected to be subsequently received from the host.

Following the bit map data stored in the bit map data transmission data (such as that shown on the right side of FIG. 12), the storage device selects the read files and initiates reading. Subsequently, the storage device sequentially sends the read files to the host in response to receiving the READ command from the host.

The bit map data created by the host has individually-assigned bits with values of [0] or [1] for each FAT entry corresponding to the first cluster numbers of all files. These bit values are the data determining whether or not the host will request data reading. The above thus describes the generation of bit map data.

(4) Processing Sequences Executed by the Host and the Storage Device

Figure 14:
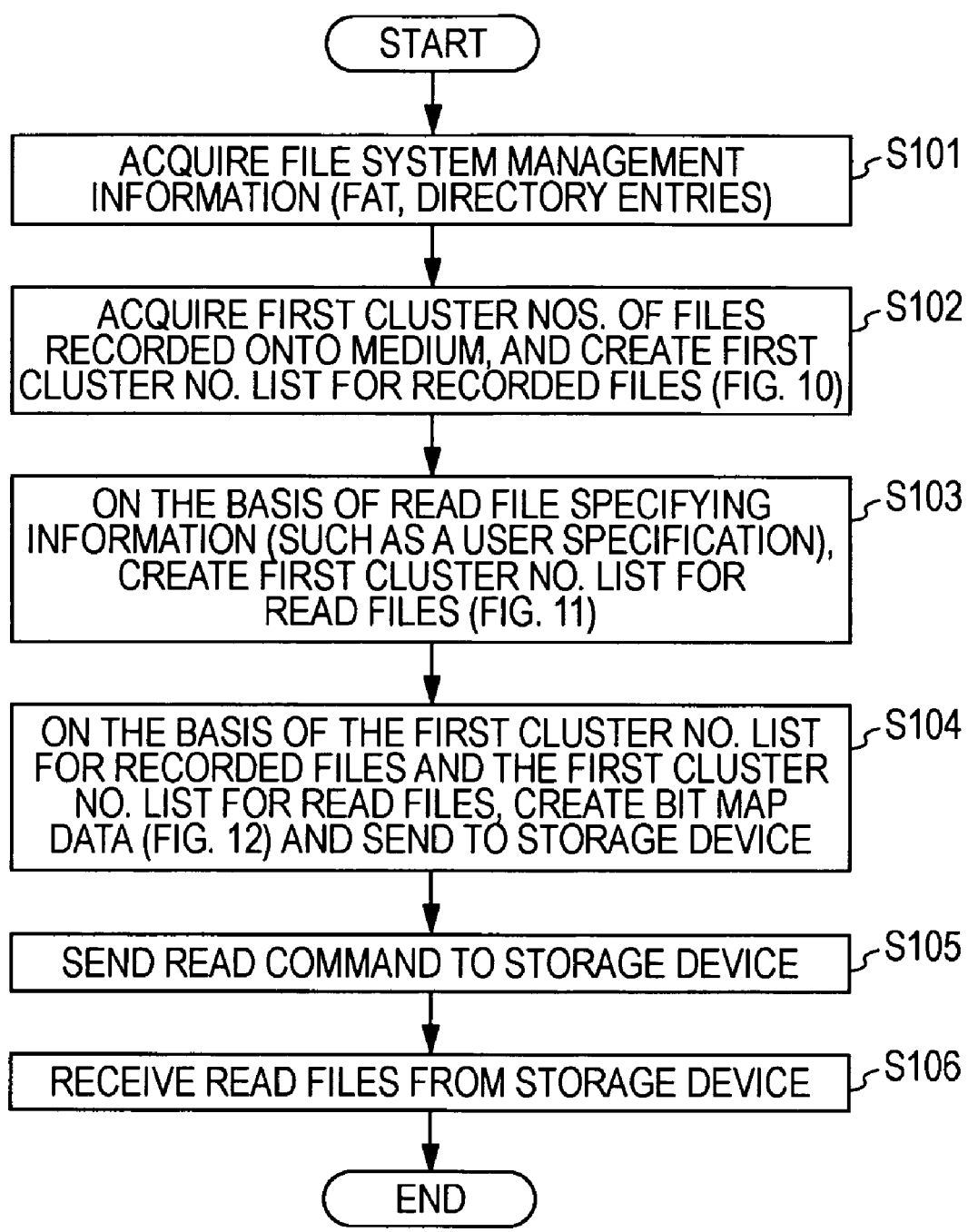
FIG. 14 is a flowchart explaining a processing sequence executed by a host.

Processing sequences executed by the host and the storage device will now be described with reference to FIGS. 14 to 16.

First, a processing sequence on the host side will be described with reference to the flowchart shown in FIG. 14. Herein, the host outputs a request to read data recorded to a data-recordable medium to a storage device having such a medium. The host is thus equivalent to a controller that conducts the data reading. The flow shown in FIG. 14 is a processing sequence executed by the (host) controller of an information processing apparatus. Using file system management information corresponding to the data recorded to the medium, the (host) controller conducts a process to generate bit map data enabling the first cluster numbers where the starting data of read files are recorded to be distinguished from the first cluster numbers where the starting data of non-read files are recorded. The generated bit map data is then output to the storage device. In other words, the bit map data transmission data shown in FIG. 13 is generated and sent to the storage device. Furthermore, the host acquires read files from the storage device by sending a command for data reading (i.e., a READ command) to the storage device.

Each step of the flowchart shown in FIG. 14 will now be described. First, in step S101, the host acquires file system management information such as the FAT and directory entries. This information may be recorded to the medium managed by the storage device, for example, and is acquired via the storage device.

Next, in step S102, the host analyzes the file system management information that was acquired in step S101, acquires the first cluster numbers of the files recorded to the medium, and creates a first cluster number list for recorded files. For example, the created list may be the first cluster number list for recorded files described with reference to FIG. 10.

Next, in step S103, the host creates a first cluster number list for read files, in accordance with read file specification information based on, for example, user-specified information. For example, the created list may be the first cluster number list for read files described with reference to FIG. 11.

Next, in step S104, the host uses the first cluster number list for recorded files and the first cluster number list for read files as a basis for creating bit map data, and then sends the bit map data to the storage device.

Bit map data is created enabling the storage device to distinguish between the case where the first cluster numbers in the first cluster number list for recorded files shown in FIG. 10 match the first cluster numbers set in the first cluster number list for read files shown in FIG. 11, and the case where the first cluster numbers do not match. For example, the bit map data shown on the right side of FIG. 12 may be created. The host then generates the bit map data transmission data shown in FIG. 13, wherein header information is defined for the above bit map data. The host then sends the bit map data transmission data to the storage device.

Herein, the host may send the bit map data to the storage device using an arbitrary method, but if SCSI commands are to be used, then the Mode Select command may be used, for example. In the Mode Select command of the SCSI standard, a data region called a Mode Page is defined for storing various information, and a storage device is able to have a freely vendor-defined Mode Page. It is thus possible to send bit map data to the storage device by assigning the bit map data to one such Mode Page. By sending a Mode Select command in this way, for example, the host is able to send the bit map data to the storage device.

Next, in step S105, the host sends a READ command like that shown by way of example in FIG. 1 to the storage device. Next, in step S106, the read files are sequentially received from the storage device.

In this process, the storage device is able to acquire the first cluster numbers of a plurality of read files on the basis of the bit map data received from the host. For this reason, it becomes possible for the host to acquire a plurality of files from the storage device by sending just one command for data reading (i.e., a READ command).

A process on the storage device side that has received bit map data from the host will now be described with reference to the flowchart shown in FIG. 15.

The storage device includes a medium upon which data is recorded, as well as a controller that records or reads data to or from the medium. From the host, the controller receives bit map data enabling the storage device to distinguish between the first cluster numbers where the starting data of read files are recorded, and the first cluster numbers where the starting data of non-read files are recorded. Applying the received bit map data and file system management information, the controller analyzes the clusters where the read files are recorded and reads files therefrom. The flow shown in FIG. 15 is executed by the controller of the storage device. The processing in each step of the flow shown in FIG. 15 will now be described in detail.

Upon receiving, from the host, bit map data transmission data having the structure shown in FIG. 13, the storage device first checks in step S201 whether or not the bit value of bit0 in Byte2 is set to a value indicating that the bit map data is valid. For example, the storage device may determined that the bit map data is valid if the bit value is [1]. If, for example, the value is [0], and the storage device determines that the bit map data is invalid, then the process is terminated without further processing.

If the bit map data is determined to be valid in step S201, then the process proceeds to step S202. In step S202, the bit map data stored in the bit map data transmission data having the structure shown in FIG. 13 is acquired and analyzed. More specifically, the values in the bit map data at Byte3 and thereafter are sequentially checked to be 0 or 1. First, the values in the 8-bit data of Byte3 shown in FIG. 13 are determined, starting at the LSB and proceeding to the MSB.

If a bit value indicates that its cluster number is recorded in the first cluster number list for read files (for example, if the bit value is [1]), then the processing in step S205 is conducted. On the other hand, if a bit value indicates that its cluster number is not recorded in the first cluster number list for read files (for example, if the bit value is [0]), then the process proceeds to step S204, the next bit is set for inspection, and the bit value determination processing in step S203 is repeated.

In this way, the processing in step S205 is conducted only in the case where a bit value indicates that its cluster number is recorded in the first cluster number list for read files. In step S206, if it is determined that the entire bit map data has been processed, then the process is terminated.

In step S203, if the bit value indicates that its cluster number is recorded in the first cluster number list for read files, then in step S205, then the first cluster number is computed for the file corresponding to a bit position based on the current bit search position.

The processing in step S205 will now be described in detail. First, the storage device counts up from the LSB (with bit0 of Byte3 taken to be the LSB) to calculate the ordinal position of the current search bit having a bit value of [1]. According to the exemplary bit map data generation method described earlier, this calculated value corresponds to the entry number counting from the top of the first cluster number list for recorded files shown in FIG. 10.

Next, on the basis of the FAT stored in the medium, the storage device acquires the first cluster numbers of all files recorded to the medium. This is equivalent to acquiring the first cluster number list for recorded files shown in FIG. 10. Since the storage device can acquire the FAT from the medium, the first cluster numbers of all files are easily acquirable. It is also possible to acquire such information in advance for storage in memory or other means.

Next, the storage device traverses a cluster chain by applying the FAT or other file system management information, and starting from the first cluster number corresponding to a bit set with a value of 1 in the bit map data. In so doing, the storage device acquires the chained cluster numbers storing file-constituting data. Since the cluster numbers and logical block addresses can both be calculated using a stipulated algorithm, the storage device is able to obtain the logical block addresses and transfer length of data to be sent to the host.

Using this cluster chain, the storage device is able to acquired the cluster numbers used to read the data constituting a single file. The acquired cluster numbers are then used to sequentially read and send the file-constituting data to the host. Herein, the timing at which data is sent to the host may be set to be after a command for data reading (i.e., a READ command) is received from the host.

After the processing in step S205, the process proceeds to step S206, and it is determined whether or not the current bit search position in the bit map data is the last bit in the bit map data. In other words, it is determined whether or not any unprocessed bits remain. If there are no unprocessed bits, then the process is terminated. If there are unprocessed bits, then the process proceeds to step S204, the bit search position is shifted one bit in the direction of the unprocessed bits, and the processing in step S203 and thereafter is repeated.

Finally, if it is determined in step S206 that the entire bit map data has been processed, then the process is terminated.

If this processing sequence is followed, then the storage device, upon receiving bit map data from the host, is able to learn the logical block addresses and data transfer lengths of data the host is attempting to read. Consequently, after receiving the bit map data, the storage device is able to initiate reading the medium in advance, before receiving a READ command from the host.

FIG. 16 illustrates a communication sequence between the host and the storage device. FIG. 16 illustrates a sequence starting when the host sends bit map data (see FIG. 13) to the storage device. This sequence diagram will now be described.

In step S301 of FIG. 16, the host sends bit map data to the storage device. Such bit map data is stored and sent in bit map data transmission data having the structure described with reference to FIG. 13.

Figure 15:
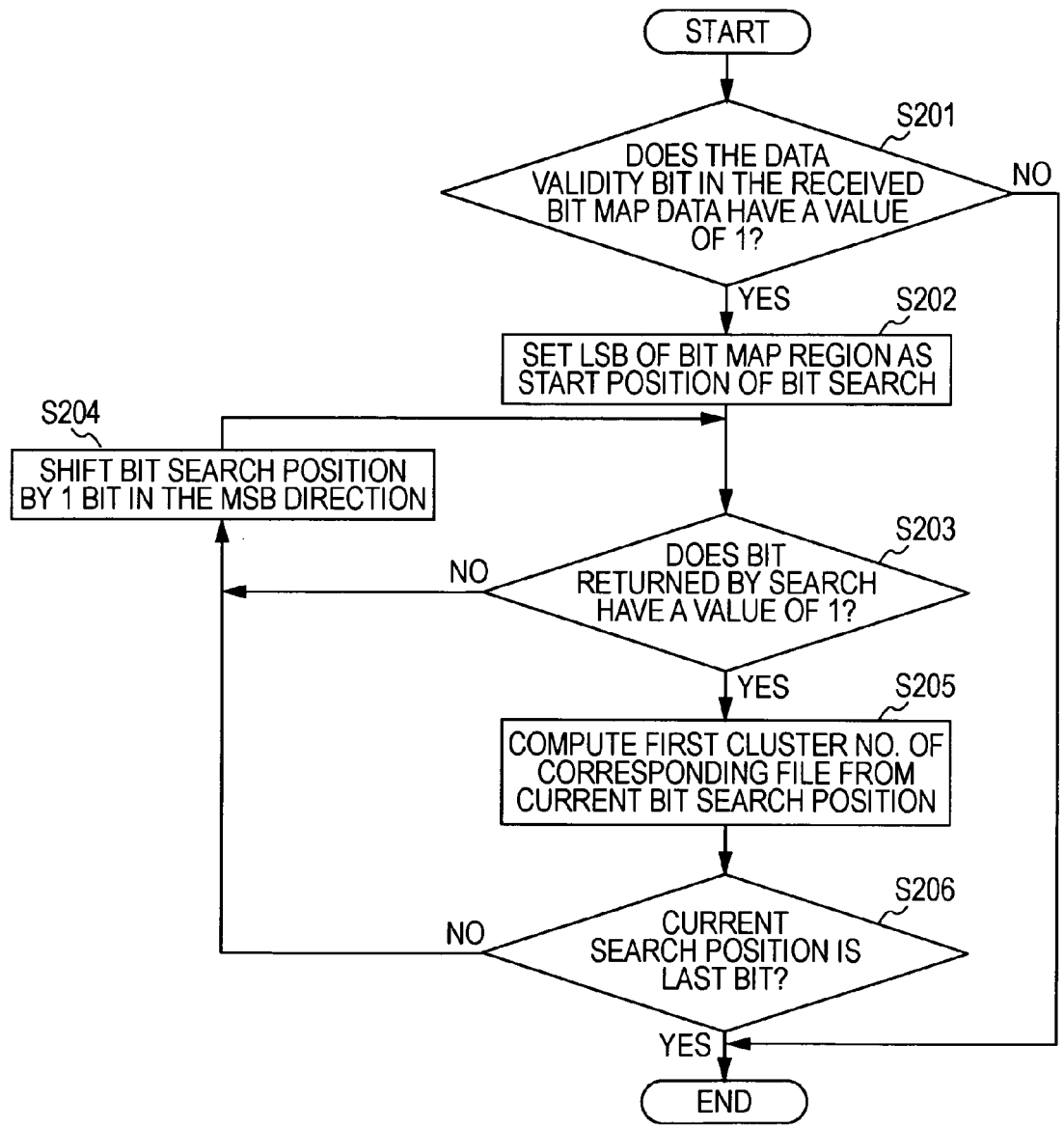
FIG. 15 is a flowchart explaining a processing sequence executed by a storage device.

Upon receiving the bit map data from host, in step S302 the storage device initiates a process following the flowchart in FIG. 15. More specifically, it is first checked whether or not the bit value of bit0 in Byte2 of the bit map data transmission data having the structure described with reference to FIG. 13 is set to a value indicating that the bit map data is valid.

If it is determined that the bit map data is acquired, the bit map data is acquired, the bit values are sequentially checked to be 0 or 1, and cluster numbers corresponding to the 1 bits are acquired. Additionally, cluster chains are traversed by applying the FAT, the positions of the clusters storing the relevant files are acquired, and the file reading process (S303) is initiated.

Subsequently, in step S304 the host sends a READ command to the storage device.

In step S305, in response to receiving the READ command from the host, the storage device sequentially sends the read data to the host. All read files specified by the bit map data are sent in consecutive series.

As shown in FIG. 16, after having sent the bit map data, the host issues a single READ command in order to start the actual data transfer. Since the logical block addresses in the LBA field of the READ command at this point are not used, their values may be set to 0, for example. Also, the value of the transfer length field in the READ command may be set to the total data transfer length of all files specified by the bit map data sent by the host in advance. Upon receiving the READ command, the storage device analyzes the bit map data, and on the basis of logical block addresses and data transfer lengths obtained therefrom, sequentially reads the data from the medium and sends the data to the host. Once the data for all files has been transferred, the process is terminated.

In FIG. 16, the process to send bit map data and the process to send a READ command from the host are shown as separate processes. However, the process to send bit map data and the process to send a READ command may also be combined and executed as a single data transmission process.

Meanwhile, in the processing executed by the storage device, the process to compute the logical block addresses and data transfer lengths of the relevant files from the bit map data may be completely conducted upon receiving the bit map data, or may be sequentially conducted during the actual data transfer. If there are many files to transfer, then a correspondingly large amount of memory is used to store the logical block addresses and data transfer lengths. For this reason, the latter method is effective when sufficient memory is unavailable.

In addition, in the case where the host subsequently reads new files using a data transfer method in accordance with an embodiment of the present invention, the host may create bit map data for specifying the new files, send the bit map data to the storage device, and read the files by means of a READ command.

In the case where the host subsequently reads new files using a data transfer method of the related art, the host may send bit map data to the storage device, appending information for indicating that the file specification in the bit map data is invalid. Thus, with respect to the earlier example, bit map data may be sent with a bit value in Byte2 (i.e., the header information of the bit map data transmission data) set to a value indicating that the bit map data is invalid.

As described in the foregoing, a data transfer process in accordance with an embodiment of the present invention enables a host to read desired data without repeatedly sending READ commands, even in the case of a plurality of files, or the case where a file is fragmented among logical block addresses scattered across the medium managed by the storage device.

In other words, bit map data is sent to the storage device, the bit map data being information capable of specifying multiple files. On the basis of such bit map data, the storage device is able to acquire the first cluster numbers of a plurality of files, and is thus able to read and transfer a plurality of files scattered across multiple clusters with just one READ command.

In this way, the storage device is able to read data from the medium on the basis of the bit map data received from the host before receiving the READ command from the host. As a result, the data transfer rate can be increased compared to those of data transfer methods of the related art.

In addition, since the host can issue a single READ command instead of one command for each of the scattered logical block addresses, the processing to analyze commands and send status data associated with the commands is also reduced to the load for just a single command. As a result, the data transfer rate can be increased compared to those of data transfer methods of the related art.

In a data transfer method in accordance with an embodiment of the present invention, the information specifying the files attempted to be read by the host is taken to be bit map data, wherein the amount of information in the data used when notifying the storage device is one bit per file. Consequently, the data transfer amount with respect to this notification can be made extremely small. As a result, the data transfer rate can be increased compared to those of data transfer methods of the related art. Furthermore, by means of the above, information regarding the files attempted to be read by the host can be stored in a small memory area in the storage device. In other words, the memory resources used can be decreased compared to those of data transfer methods of the related art, and the system can be reduced in size and cost.

In addition, a data transfer process in accordance with an embodiment of the present invention can be executed without departing from the command standard heretofore used for data transfer between a host and a storage device. Consequently, development of independent device drivers for executing an embodiment of the present invention can be omitted, and existing device drivers may be used. Consequently, an embodiment in accordance with the present invention has the merit of being easy to develop for system developers. Moreover, the effort by the user to replace device drivers can be omitted, and efficient data transfer in accordance with an embodiment of the present invention can be realized by means of a simple, low-cost system.

The foregoing thus describes the present invention in detail and with reference to specific exemplary embodiments. However, it should be appreciated as obvious that persons skilled in the art may make modifications or substitutions with respect to an embodiment without departing from the scope and spirit of the present invention. In other words, the present invention has been disclosed by means of examples, which are not to be interpreted as being limiting. The scope of the present invention is to be determined in conjunction with the attached claims.

In addition, it is possible to execute the series of processes described in the present specification by means of hardware, software, or a compound configuration of both hardware and software. In the case of execution by means of software, a program stating a processing sequence may be installed and executed in the memory of a computer built into special-purpose hardware. Alternatively, the program may be installed and executed on a general-purpose computer capable of executing various processing. For example, the program may be recorded onto a recording medium in advance and then installed onto a computer. In addition, the program may be received via a network such as a LAN (Local Area Network) or the Internet, and then installed to a recording medium such as an internal hard disk.

It should also be appreciated that the various processes described in the present specification are not limited to being executed in a time series following that described herein, but may also be executed in parallel or individually, depending on the processing capability of the apparatus executing the process or other factors. In addition, in the present specification, a system refers to the logical assembly of a plurality of apparatus, and is not limited to respective apparatus being housed in a single physical unit.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a controller configured to read data by outputting, to a storage device having a non-transitory data-recordable medium, a request for reading data recorded to the non-transitory data-recordable medium;
wherein
using file system management information corresponding to the data recorded to the non-transitory data-recordable medium, the controller generates, and outputs to the storage device, bit map data enabling the storage device to distinguish between first cluster numbers where a starting data of read files are recorded, and first cluster numbers where a starting data of non-read files are recorded,
the bit map data including respective bits for respective first cluster numbers in a first cluster number list for recorded files, the first cluster number list for recorded files being a list containing the first cluster number for each file recorded to the non-transitory data-recordable medium, and the respective bit for each first cluster number indicating whether or not the first cluster number corresponds to a file that is to be read from the non-transitory data-recordable medium.

2. The information processing apparatus according to claim 1, wherein using the file system management information, the controller generates the first cluster number list for recorded files, and a first cluster number list for read files, being a list of the first cluster numbers where the starting data is recorded for selected files scheduled to be read, and
wherein the controller generates the bit map data by cross-checking each entry in the first cluster number list for recorded files with each entry in the first cluster number list for read files.

3. The information processing apparatus according to claim 1, wherein the controller generates, and outputs to the storage device, transmission data by setting header information with respect to the bit map data, the header information containing information for determining validity of the bit map data.

4. The information processing apparatus according to claim 1, wherein the controller generates the bit map data by applying the file system management information in the form of a FAT (File Allocation Table) and directory entries.

5. The information processing apparatus according to claim 1, wherein the controller acquires from the storage device read data for one or a plurality of files identified by the bit map data by sending a single command for reading data to the storage device.

6. A storage device, comprising:
a non-transitory medium upon which data is recorded; and
a controller configured to write or read data with respect to the non-transitory medium;
wherein
the controller receives, from a host, bit map data enabling the controller to distinguish between first cluster numbers where a starting data of read files requested by the host are recorded, and first cluster numbers where a starting data of non-read files are recorded, and
the controller reads files by applying the received bit map data and file system management information to analyze the first cluster numbers where the starting data of read files requested by the host are recorded, the bit map data including respective bits for respective first cluster numbers in a first cluster number list for recorded files, the first cluster number list for recorded files being a list containing the first cluster number for each file recorded to the non-transitory medium, and the respective bit for each first cluster number indicating whether or not the first cluster number corresponds to a file that is to be read from the non-transitory medium.

7. An information processing system, comprising:
a host configured to use file system management information corresponding to data recorded to a non-transitory medium to thereby generate, and output to a storage device, bit map data enabling the storage device to distinguish between first cluster numbers where a starting data of read files are recorded, and first cluster numbers where a starting data of non-read files are recorded; and
a storage device configured to receive the bit map data from the host, and read files by applying the received bit map data and the file system management information to analyze the first cluster numbers where the starting data of read files requested by the host are recorded, the bit map data including respective bits for respective first cluster numbers in a first cluster number list for recorded files, the first cluster number list for recorded files being a list containing the first cluster number for each file recorded to the non-transitory medium, and the respective bit for each first cluster number indicating whether or not the first cluster number corresponds to a file that is to be read from the non-transitory medium.

8. An information processing method executed in an information processing apparatus, comprising the steps of:
using file system management information corresponding to data recorded to a non-transitory medium to thereby generate, and output to a storage device, bit map data enabling the storage device to distinguish between first cluster numbers where a starting data of read files are recorded, and first cluster numbers where a starting data of non-read files are recorded;
outputting a request read data recorded to the non-transitory medium to the storage device; and
sequentially receiving from the storage device all data for the read files identified by the bit map data, the bit map data including respective bits for respective first cluster numbers in a first cluster number list for recorded files, the first cluster number list for recorded files being a list containing the first cluster number for each file recorded to the non-transitory medium, and the respective bit for each first cluster number indicating whether or not the first cluster number corresponds to a file that is to be read from the non-transitory medium.

9. A non-transitory computer-readable medium having stored thereon a program causing information processing to be executed in an information processing apparatus, the information processing comprising the steps of:
using file system management information corresponding to data recorded to a non-transitory medium to thereby generate, and output to a storage device, bit map data enabling the storage device to distinguish between first cluster numbers where a starting data of read files are recorded, and first cluster numbers where a starting data of non-read files are recorded;

outputting a request read data recorded to the non-transitory medium to the storage device; and sequentially receiving from the storage device all data for the read files identified by the bit map data, the bit map data including respective bits for respective first cluster numbers in a first cluster number list for recorded files, the first cluster number list for recorded files being a list containing the first cluster number for each file recorded to the non-transitory medium, and the respective bit for each first cluster number indicating whether or not the first cluster number corresponds to a file that is to be read from the non-transitory medium.

* * * * *